United States Patent [19]

Lamont et al.

[11] 4,122,057

[45] Oct. 24, 1978

[54] MIXED-TERMINATED POLYESTER PLASTICIZERS

[75] Inventors: James Lamont; Robert D. Aylesworth, both of Cincinnati, Ohio; Bruce J. Beimesch, Crescent Springs, Ky.

[73] Assignee: Emery Industries, Inc., Cincinnati, Ohio

[21] Appl. No.: 673,570

[22] Filed: Apr. 5, 1976

Related U.S. Application Data

[63] Continuation-in-part of Ser. No. 510,337, Sep. 3, 1974, abandoned.

[51] Int. Cl.$^2$ .................... C07C 69/34; C07C 69/90; C08K 5/11; C08K 5/12
[52] U.S. Cl. .................................. 260/31.6; 560/90; 560/199
[58] Field of Search .............. 260/31.6, 485 G, 475 P; 560/199, 90

[56] References Cited

U.S. PATENT DOCUMENTS

| | | | |
|---|---|---|---|
| 2,575,195 | 11/1951 | Smith | 260/485 G |
| 2,647,099 | 7/1953 | Smith | 260/485 G |
| 3,149,087 | 9/1964 | Anagnostopoulos | 260/31.6 |
| 3,169,945 | 2/1965 | Hostettler et al. | 260/485 G |
| 3,786,011 | 1/1974 | Price et al. | 260/31.6 R |

FOREIGN PATENT DOCUMENTS

| | | | |
|---|---|---|---|
| 522,931 | 10/1953 | Belgium | 260/31.6 |
| 560,036 | 7/1958 | Canada | 260/31.6 |
| 1,137,882 | 12/1968 | United Kingdom | 260/31.6 |

*Primary Examiner*—Allan Lieberman
*Attorney, Agent, or Firm*—Gerald A. Baracka; John D. Rice

[57] ABSTRACT

Polyester plasticizers having improved low temperature properties are obtained by terminating the polyester with mixed chain-terminating agents. Mixtures of monobasic acids and monofunctional alcohols are employed for this purpose. The polyesters of this invention find particular utility as plasticizers for PVC homopolymers and copolymers.

9 Claims, No Drawings

MIXED-TERMINATED POLYESTER PLASTICIZERS

CROSS-REFERENCES

This is a continuation-in-part of our copending application Ser. No. 510,337, filed Sept. 3, 1974, now abandoned.

BACKGROUND OF THE INVENTION

The use of polyesters as plasticizers for polyvinylchloride (PVC) homopolymers and copolymers is known. The use of these plasticizers has grown markedly in recent years due to their low volatility and resistance to migration. There are, however, certain disadvantages associated with the use of polyester plasticizers. The polyesters are not as efficient as simple ester plasticizers and large amounts are therefore required to achieve the same level of flexibility — with resulting decrease in the mechanical properties of the resin. Also, the heretofore known polyesters adversely affect the low temperature properties of the final product as compared to the simple ester plasticizers.

It is an object of this invention to produce mixed-terminated polyesters capable of imparting flexibility and softness for PVC and other resinous materials. A further objective is to provide plasticizers having superior low temperature performance, low volatility and resistance to extraction.

SUMMARY OF THE INVENTION

We have now discovered mixed-terminated polyesters which are effective plasticizers for a variety of resins, including PVC homopolymers and copolymers. Quite unexpectedly it has been found that with the polyesters terminated in accordance with this invention it is possible to achieve improved low temperature preformance of the plasticized vinyl resins as compared to identical resins plasticized with polyesters terminated either solely with monobasic acids or solely with monofunctional alcohols. The present mixed-terminated plasticizers, in addition to having excellent low temperature properties, exhibit low volatility, excellent permanence and resistance to extraction with aqueous and organic solutions.

The polyesters of this invention typically have molecular weights from about 500 to 5000, are obtained by the esterification of a dibasic acid, glycol and mixed-terminator consisting of monobasic acid and monofunctional alcohol and correspond to the structural formula

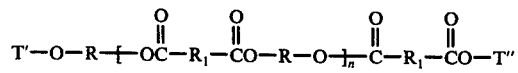

wherein R represents a bivalent hydrocarbon radical containing from 2 to 6 carbon atoms; $R_1$ represents a bivalent hydrocarbon radical containing from 2 to 10 carbon atoms and, more preferably, from 4 to 8 carbon atoms; $n$ represents a positive integer from 1 to 9; T' is an acyl radical containing 4 to 18 carbon atoms and, more preferably, 8 to 18 carbon atoms; and T" is an alkyl radical containing 4 to 18 carbon atoms, and more preferably 6 to 12 carbon atoms. Useful glycols for the preparation of this plasticizer contain from about 2 to 6 carbon atoms and the dibasic acid can contain from about 4 to 12 carbon atoms. The dibasic acids can be aliphatic or can be a mixture of aliphatic and aromatic, such as phthalic acid or the anhydride thereof. Preferably the dibasic acid will contain from 6 to 10 carbon atoms. The terminating agent consists of a mixture of a monobasic acid containing 4 to 18 carbon atoms and, more preferably, 8 to 18 carbon atoms and a monofunctional alcohol containing 4 to 18 carbon atoms, and more preferably, 6 to 12 carbon atoms. The molar ratio of monobasic acid to monofunctional alcohol ranges between 0.5:1.5 to 1.5:0.5. The present polyesters are particularly useful with PVC homopolymers and PVC copolymers having vinyl chloride contents of 50% or more.

DETAILED DESCRIPTION

The polyester plasticizers of this invention conforming essentially to the structural formula

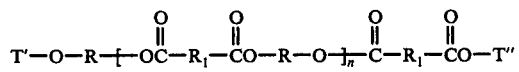

wherein R represents a bivalent hydrocarbon radical containing from 2 to 6 carbon atoms; $R_1$ represents a bivalent hydrocarbon radical containing from 2 to 10 carbon atoms and, more preferably, from 4 to 8 carbon atoms; $n$ represents a positive integer from 1 to 9; T' is an acyl radical containing 4 to 18 carbon atoms and, more preferably, 8 to 18 carbon atoms; and T" is an alkyl radical containing 4 to 18 carbon atoms, and more preferably 6 to 12 carbon atoms. These products have molecular weights from 500 and 5000 and more preferably from 600 to 2500. It will be evident to those skilled in the art that the molecular weights are average molecular weights and the distribution of the polyesters may vary considerably. This feature does not detract from the desirability of the polyester plasticizers however. Similarly, the skilled artisan will recognize that the structural formula represents the ideal molecule obtained when equimolar amounts of the glycol and dibasic acid are used and the mole ratio of the monobasic acid to monofunctional alcohol making up the mixed terminator is 1:1. It is evident, however, that not every molecule will be terminated with both an alkyl and an acyl radical due to the random nature of the reaction. Furthermore, the formula does not take into account for possible variations in the mole ratio of monobasic acid to monofunctional alcohol.

Glycols useful for the preparation of the polyesters of this invention are aliphatic, saturated, branched or unbranched glycols containing from 2 to 6 carbon atoms. These include, for example, ethylene glycol, 1,3-propanediol, 1,4-butanediol, 1,5-pentanediol, 1,6-hexanediol, neopentyl glycol, 2-methyl-1,3-propanediol, 3-methyl-1,5-pentanediol, 2,3-dimethyl-2,3-butanediol, 1,3-butylene glycol, 1,2-butanediol, 1,2-propylene glycol, 1,2-pentanediol, 1,3-pentanediol, 1,4-pentanediol and mixtures thereof.

Useful dibasic acids are aliphatic acids containing from 4 to 12 carbon atoms or mixtures of these aliphatic acids with aromatic dibasic acids, such as phthalic acid or the anhydride thereof. Useful aliphatic acids are typically saturated and may be branched or unbranched. Representative aliphatic dibasic acids include adipic acid, pimelic acid, suberic acid, sebacic acid, azelaic acid, dodecandioic acid and mixtures thereof. When aromatic acids or anhydrides are included they can constitute up to about 75 Wt. % of the total dibasic acid charge, however, they will more generally be present in amounts up to about 50 Wt. %. Saturated aliphatic dibasic acids containing from 6 to 10 carbon atoms are particularly useful for this invention.

To obtain the improved plasticizers of this invention it is essential that a mixture of terminating agents be employed in an amount such that the molecular weight of the resulting polyester is between about 500 and 5000. The terminating agent consists of a mixture of monobasic acid and a monofunctional alcohol. Equally effective are mixtures wherein several monobasic acids and/or monofunctional alcohols are present. The molar ratio of monobasic acids(s) to monofunctional alcohol(s) will range from about 0.5:1.5 to 1.5:0.5. Excellent results are obtained when this ratio is about 1:1. In the makeup of the mixed terminator, monobasic acids containing from about 4 to 18 carbon atoms, and more preferably, 8 to 18 carbon atoms will be used. Useful aliphatic branched- or straight-chain (i.e. unbranched) monobasic acids include such acids as butyric acid, valeric acid, caproic acid, caprylic acid, capric acid, myristic acid, palmitic acid, stearic acid, 2-ethylhexoic acid, isostearic acid and mixtures thereof. The monofunctional alcohols are branched- or straight-chain (i.e. unbranched) aliphatic alcohols containing about 4 to 18 carbon atoms and, more preferably, 6 to 12 carbon atoms. These include, for example, n-butanol, isobutanol, isoamyl alcohol, n-hexyl alcohol, n-octyl alcohol, 2-ethylhexanol, 2,2-dimethylpentanol, 2,2,4-trimethylpentanol, lauryl alcohol, myristyl alcohol and mixtures thereof.

Superior polyester plasticizers are obtained when the dibasic acid is adipic acid or azelaic acid, used by themselves or in combination with phthalic acid; the glycol is 1,2-propylene glycol, 1,3-butylene glycol, 1,4-butanediol or any combination thereof; and the terminating agent is a mixture of (a) $C_8$–$C_{18}$ monobasic acids or mixtures thereof and (b) $C_6$–$C_{12}$ aliphatic monofunctional alcohols or mixtures thereof. Monobasic acid mixtures or mixtures of monofunctional alcohols are particularly useful as they are readily obtainable from commercial sources and impart very favorable economics to the plasticizers of this invention. Mixtures of pelargonic acid or lauric acid with 2-ethylhexanol also provide extremely useful mixed terminators for this invention. Polyesters having improved properties typically have acid values less than 10 and hydroxyl values less than 20.

Polyesters obtained in accordance with this invention exhibit superior plasticizer properties when used with a variety of resinous products but find particular utility for use with PVC homopolymers and copolymers. Particular advantage is realized with PVC resins having vinyl chloride contents above about 50% by weight. Polyvinyl chloride copolymers for which the present polyesters are useful include any of those obtained when vinyl chloride is polymerized with vinyl bromide, vinyl acetate, vinyl butyrate, vinyl propionate, methyl methacrylate, vinylidine chloride, 2-ethylhexyl acrylate, acrylonitrile, methacrylonitrile, styrene and the like, or combinations of two or more of these comonomers. The present plasticizers can also be used with butyl rubber, polyvinylidene chloride, chlorinated PVC, polyvinylbutyral, cellulose acetate, cellulose butyrate or the like.

The plasticizers are readily compatible with the aforementioned polymers and can be utilized at levels ranging from about 10 to 110 parts, but more preferably, are employed at levels from 30 to 80 parts by weight per 100 parts of the PVC homopolymer and copolymer. Other compounding ingredients can also be used in conjunction with the plasticizers of this invention in formulating the finished product. For example, stabilizers to protect the resins against the deleterious effects of oxidative, thermal and photochemical degradation, pigments, dyes, fillers, lubricants and other processing aids can be included with the plasticizer. The physical properties of the formulated resins can be widely varied by manipulating the amounts and types of ingredients employed in compounding the resin. The polyesters of this invention have excellent stability when subjected to processing conditions and do not appreciably degrade when maintained at elevated temperatures for prolonged periods. These products also exhibit low volatility so that losses during processing are minimal. The polyesters are essentially odorless and colorless and do not add appreciably to the color of the resulting plasticized sheets. If improvement in the color of the polyester is desired, it can be bleached with peroxide, hypochlorite or other suitable bleaching agents or decolorized using bleaching clays, charcoal or the like. Clear, pliable sheets are obtained when the plasticizers are incorporated into PVC and the polyester does not exude from the sheet upon standing. Most importantly, however, using the polyester of the present invention significant improvement in low temperature performance is possible. This is particularly surprising and unexpected since polyesters prepared in an identical manner and derived from the same glycols and dibasic acids but terminated either solely with monobasic acids or solely with monofunctional alcohols do not exhibit the same superior low temperature characteristics. Although the chain-terminated agents employed in the preparation of the polyester plasticizers of this invention are not in themselves novel and they have been used individually as chain-stopping agents, it is completely unexpected that by utilizing a mixture of these terminating agents superior low temperature properties are possible.

The reaction of the dibasic acid, glycol and terminating agents is conducted in conventional equipment using established esterification procedures. Typically, the reactants are charged to a suitable esterification kettle as a unit charge and heated to about 150°–250° C at atmospheric pressure until the reaction is substantially complete — usually 3 to 8 hours. The esterification can be promoted using suitable catalysts such as phosphoric acid, sulfuric acid, p-toluenesulfonic acid, methanesulfonic acid, dibutyl tin oxide, tetrabutyl titanite, zinc acetate and the like. The amount of catalyst can vary but usually will range from about 0.01 to 1.0 percent by weight of the total reactant charge. While the reaction may be conducted entirely at atmospheric pressure it is generally more desirable to reduce the pressure to about 2–50 mm Hg. at 200°–250° C during the final stages of the reaction to remove the last traces of water and strip off excess glycol or other volatiles which may be present. In this way acid values less than 10 and hydroxyl values less than 20 are obtained. Inert diluents such as benzene, toluene, xylene or the like can be used as the reaction medium for conducting the reaction, however, it is more usual to charge an excess of the glycol based on the stoichiometric or equivalent amount calculated for the acid present. The excess glycol is distilled from the reactor as the esterification reaction is carried to completion and may be recycled, if desired. Usually up to about 25% by weight excess glycol will suffice for this purpose, however, larger excesses can be used.

The following Examples illustrate the invention more fully, however, they are not intended as a limitation on the scope thereof. In the Examples all parts and percentages are on a weight basis unless otherwise indicated.

EXAMPLE I

A reactor equipped with a suitable stirrer, thermometer and distillation column topped with a condenser was charged as follows:

| Azelaic acid | 2 moles |
|---|---|
| 1,2-propylene glycol | 2 moles |
| Lauric Acid | 1 mole |
| 2-Ethylhexanol | 1 mole |

About 25% excess of the hydroxy-containing materials were charged to drive the reaction. The reaction mixture was then slowly heated with agitation while removing the water of reaction. A small amount (0.02%) $H_3PO_2$ was added to the reaction mixture to catalyze the reaction. When the rate of reaction slowed, as evidenced by a marked reduction in the rate of water evolution, 0.03% butyl titanate catalyst was added and the pressure gradually reduced to 20 torr to achieve a controlled rate of stripping (removal of water and excess hydroxy-containing materials). When an acid value of 0.4 was reached the reaction mixture was allowed to cool to room temperature and filtered using a diatomaceous earth filter aid to remove catalyst residue and other impurities. The final polyester product had an acid value of 0.3, hydroxyl value of 5.3 and 100° F viscosity of 80.2. The average molecular weight of the polyester was 770.

The polyester was used as a plasticizer for PVC homopolymers and copolymers without further modification or processing. To demonstrate the superior low temperature properties obtainable with this plasticizer a PVC formulation was prepared as follows:

| PVC resin (Geon 102 EPF5) | 100 parts |
|---|---|
| Triphenyl phosphite | 1 part |
| Mixed barium-cadmium soaps | 2 parts |
| Polyester plasticizer | 56 parts |

These ingredients were blended for about 10 minutes on a standard two-roll mill heated to about 170° C. The sheets obtained from the mill were then pressed to uniform thickness using a chrome-plated ASTM mold (170° C for 6 minutes; 1500 psi). Suitable specimens were cut from these sheets for the various tests.

The brittle point of the plasticized PVC was −38° C as determined with the Scott Brittleness Tester in accordance with modified ASTM test procedure D 746-57 T. Physical properties as determined using an Instron Tester (pull rate 5 inches per minute) were as follows: 100% modulus (psi) 1150; tensile strength (psi) 2800; and 330% elongation.

EXAMPLE II

Following the same procedure as described in Example I, a mixed-terminated polyester was prepared by the reaction of 2 moles adipic acid, 2 moles 1,2-propylene glycol, 1 mole lauric acid and 1 mole lauryl alcohol. The resulting polyester product had an average molecular weight of about 742, and acid value of 0.3 and 100° F viscosity of 71.7. The platicized PVC containing 56 phr of this polyester and formulated in accordance with the procedure of Example I had a brittle point of −38° C and modulus (100%) of 1475 psi. An identical formulation plasticized with 50 phr dioctyl phthalate had a brittle point of −30° C.

To demonstrate the superior low temperature properties obtainable with mixed-terminated polyesters as compared to polyesters terminated with all monobasic acid or all monofunctional alcohol the following comparative experiments were conducted in an identical manner. In the first experiment a polyester was prepared from 2 moles adipic acid, 3 moles 1,2-propylene glycol and 2 moles lauric acid. This polyester had an average molecular weight of 816, 100° F viscosity of 111.1 centistokes, and when formulated with PVC in accordance with the above recipe gave a brittle point of −28° C. In another experiment a polyester was prepared from 3 moles adipic acid, 2 moles 1,2-propylene glycol and 2 moles lauryl alcohol. The resulting solid product (AV 1.2) had an average molecular weight of 846 and PVC plasticized therewith had a brittle point of −33° C.

EXAMPLES III–IX

A series of mixed-terminated polyester plasticizers were prepared using the above-described procedure. In these Examples the dibasic acid was adipic acid while the glycols and mixed terminators were varied. Table I sets forth the type and molar amount of each of the reactants employed. The acid value, hydroxyl value and 100° F viscosity of the resulting products are also reported. These polyesters were all formulated with PVC homopolymer in accordance with the recipe and procedure of the previous Examples. Modulus, tensile, elongation and brittle point are reported for each formulated resin in the table.

EXAMPLE X

A mixed-terminated polyester having an average molecular weight of about 1050 was prepared by reacting 3 moles adipic acid, 3 moles 1,2-propylene glycol, 1 mole 2-ethylhexanol and 1 mole of a mixture of aliphatic acids containing about 35% myristic acid, 55% palmitic acid and 10% stearic acid. The reaction was conducted in accordance with the already described procedures. The resulting liquid polyester had an acid value of 2.2, hydroxy value of 11.1 and 100° F viscosity of 82 centistokes. Fifty-six parts of this polyester was milled with 100 parts PVC homopolymer and 3 parts stabilizer and clear pliable sheets obtained. The vinyl composition had a brittle point of −29° C and a tensile strength of 3000 psi at 320% elongation. The volatility of the plasticizer at 90° C was only 3.2% as determined by ASTM D 1203-55.

To demonstrate the improved low temperature properties obtained with the polyester of this invention, comparative examples were conducted. In one of the comparisons 3 moles adipic acid, 2 moles 1,2-propylene glycol and 2 moles 2-ethylhexanol were reacted to obtain a polyester of average molecular weight 850. PVC homopolymer plasticized therewith (56 phr plasticizer) had a brittle point of −27° C. In another comparative test, 2 moles adipic acid, 3 moles 1,2-propylene glycol and 2 moles of the mixed aliphatic acids were reacted. This polyester had a molecular weight of 1032. PVC homopolymer plasticized with 56 phr of the plasticizer had a brittle point of −8° C.

TABLE I

| EXAMPLE | III | IV | V | VI | VII | VIII | IX |
|---|---|---|---|---|---|---|---|
| Adipic Acid (moles) | 2 | 2 | 2 | 2 | 10 | 2 | 2 |
| GLYCOLS (moles): | | | | | | | |
| Neopentyl glycol | | | | 2 | | | |
| 1,4-butanediol | | | 2 | | | | |
| 1,2-propylene glycol | 2 | 2 | | | 10 | 2 | 2 |
| MONOBASIC ACID (moles): | | | | | | | |
| Pelargonic Acid | 1 | | | | | | |
| Lauric Acid | | 1 | 1 | 1 | 1 | | |
| 2-Ethylhexoic Acid | | | | | | 1 | 1 |
| MONOFUNCTIONAL ALCOHOL (Moles): | | | | | | | |
| 2-Ethylhexanol | 1 | 1 | 1 | 1 | 1 | | 1 |
| Lauryl alcohol | | | | | | 1 | |
| Acid value | 1.0 | 0.9 | 0.7 | 0.8 | 0.3 | 0.9 | 0.8 |
| Hydroxyl value | 7.8 | 3.9 | 2.8 | 3.7 | 9.4 | 8.8 | 9.7 |
| 100° F Viscosity (centistokes) | 107 | 84.9 | 140.0 | 121.2 | 2960 | solid | 70.7 |
| PHYSICAL PROPERTIES: | | | | | | | |
| 100% Modulus (psi) | 1300 | 1300 | 1200 | 1300 | 1800 | 1300 | 1200 |
| Tensile Strength (psi) | 3100 | 2950 | 2800 | 2900 | 2850 | 2850 | 2850 |
| Elongation (%) | 340 | 330 | 320 | 330 | 310 | 330 | 325 |
| Brittle Point (° C) | −22 | −32 | −33 | −28 | −12 | −33 | −27 |

EXAMPLE XI

To demonstrate the versatility of this invention and the ability to obtain polyesters using aromatic anhydrides a polyester was prepared by reacting 3 moles adipic acid, 1 mole phthalic anhydride and 4 moles 1,2-propylene glycol. This polyester was terminated with a mixture of 1 mole 2-ethylhexanol and 1 mole of the mixed aliphatic monobasic acids of Example X. The resulting polyester had a molecular weight of 1276, an acid value of 0.6, hydroxyl value of 11.6 and 100° F viscosity of 231 centistokes. PVC resin plasticized with 56 phr thereof had a brittle point of −22 and tensile of 3100 psi at 265% elongation. Volatility of the polyester plasticizer at 90° C was only 2.1%. For comparative purposes, polyesters were prepared from (a) 3 moles adipic acid, 1 mole phthalic anhydride, 3 moles 1,2-propylene glycol and 2 moles 2-ethylhexanol and (b) 2 moles adipic acid, 1 mole phthalic acid and 4 moles 1,2-propylene glycol and 2 moles of the mixed aliphatic monobasic acids. These polyesters had respective molecular weights of 1074 and 1256. PVC homopolymers plasticized at 56 phr level with (a) and (b) had brittle points of −17° C and −2° C, respectively.

To further demonstrate the utility of these mixed-terminated plasticizers and their resistance to extraction with various aqueous and organic solutions, 2 ½ inch diameter specimens were stamped from 20 mil sheets of the plasticized resin and extracted for 24 hours to determine the weight loss. Upon extraction with soapy water at 90° C 12.8% weight loss was observed. 5.6% Weight loss was obtained after 24 hours extraction with hexane at room temperature. Extraction with mineral oil (Atreol #9 white oil) at 50° C resulted in only 2.7% weight loss.

EXAMPLE XII

By esterifying 1 mole adipic acid, 1 mole phthalic anhydride, 2 moles 1,2-propylene glycol and a terminating mixture consisting of 1 mole lauric acid and 1 mole 2-ethylhexanol, a polyester having an acid value of 0.4, hydroxyl value of 5.9 and 100° F viscosity of 209.2 was obtained. This product was employed to plasticize PVC homopolymer and copolymer at 56 phr level. The resulting plasticized vinyl resin compositions had superior brittle points as compared to identical resins plasticized with polyesters terminated solely with lauric acid or solely with 2-ethylhexanol. The polyester exhibited low volatility, excellent permanence and additionally had excellent resistance to extraction with soapy water, hexane and mineral oil. Mechanical properties of the plasticized vinyl resins were acceptable for general purpose usage.

The above Examples clearly demonstrate that superior plasticizers are obtained when polyesters are terminated with a mixed terminating agent consisting of a mixture of monobasic acid and monofunctional alcohol. The much improved low temperature properties are evident. Furthermore, it can readily be seen that the plasticizers of this invention have excellent permanence and are resistant to extraction. These plasticizers do not impart objectionable color to the vinyl resins and do not exude from the resin. The polyesters have very low volatility and can be processed at elevated temperatures with minimal loss due to volatilization.

The present mixed-terminated polyesters are useful in a variety of applications. They may be used in extruded products and plastisol applications. Because of their permanence and superior low temperature properties they are acceptable for use in outdoor furniture, footwear and in automotive applications. They may also be used with coated fabrics and for metallic coatings. The present plasticizers also find application in synthetic rubbers such as neoprene and butadiene/acylonitrile rubber.

We claim:

1. A mixed-terminated polyester plasticizer characterized by having improved low temperature properties and having an average molecular weight between 500 and 5000, an acid value less than 10, hydroxyl value less than 20 and corresponding to the formula

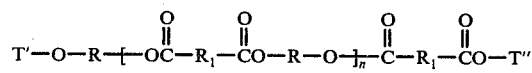

wherein R is a bivalent hydrocarbon radical containing from 2 to 6 carbon atoms, $R_1$ is a bivalent hydrocarbon radical containing from 2 to 10 carbon atoms, T' is an acyl radical containing 4 to 18 carbon atoms, T" is an alkyl radical containing from 4 to 18 carbon atoms, $n$ is a positive integer from 1 to 9 and consisting essentially of the reaction product of 2 to 10 moles of (a) an aliphatic glycol containing 2 to 6 carbon atoms, with an equimolar amount of (b) an aliphatic dibasic acid containing 4 to 12 carbon atoms or a mixture of $C_4$-$C_{12}$ aliphatic dibasic acid and aromatic dibasic acid or anhydride thereof, and terminated with (c) a mixture of an aliphatic monobasic acid containing 4 to 18 carbon atoms and an aliphatic monofunctional alcohol containing 4 to 18 carbon atoms, the molar ratio of said monobasic and monofunctional alcohol in the mixture ranging between 0.5:1.5 and 1.5:0.5.

2. The mixed-terminated polyester plasticizer of claim 1 wherein the average molecular weight is between 600 and 2500 and (c) is a mixture of a $C_{8-18}$ monobasic acid and $C_{6-12}$ monofunctional alcohol.

3. The mixed-terminated polyester plasticizer of claim 2 wherein (a) is 1,2-propylene glycol, 1,3-butylene glycol or 1,4-butanediol and (b) is adipic acid or azelaic acid.

4. The mixed-terminated polyester plasticizer of claim 3 wherein the molar ratio of monobasic acid to monofunctional alcohol is about 1:1.

5. The mixed-terminated polyester plasticizer of claim 3 wherein (c) is a mixture of pelargonic acid and 2-ethylhexanol.

6. The mixed-terminated polyester plasticizer of claim 3 wherein (c) is a mixture of lauric acid and 2-ethylhexanol.

7. The mixed-terminated polyester plasticizer of claim 1 having an average molecular weight from about 600 to 2500.

8. The mixed-terminated polyester plasticizer of claim 7 wherein $R_1$ contains from 4 to 8 carbon atoms, T' contains from 8 to 18 carbon atoms and T" contains from 6 to 12 carbon atoms.

9. A plasticized vinyl resin composition comprising a polyvinyl chloride homopolymer or copolymer and 10 to 110 parts, per 100 parts resin, of a mixed-terminal polyester plasticizer corresponding essentially to the formula

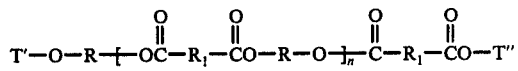

wherein R is a bivalent hydrocarbon radical containing from 2 to 6 carbon atoms, $R_1$ is a bivalent hydrocarbon radical containing from 2 to 10 carbon atoms, T' is an acyl radical containing 4 to 18 carbon atoms, T" is an alkyl radical having from 4 to 18 carbon atoms, $n$ is a positive integer from 1 to 9 and consisting essentially of the reaction product of 2 to 10 moles of (a) an aliphatic glycol containing 2 to 6 carbon atoms, with an equimolar amount of (b) an aliphatic dibasic acid containing 4 to 12 carbon atoms or a mixture of $C_4$-$C_{12}$ aliphatic dibasic acid and aromatic dibasic acid or anhydride thereof, and terminated with (c) a mixture of an aliphatic monobasic acid containing 4 to 18 carbon atoms and an aliphatic monofunctional alcohol containing 4 to 18 carbon atoms, the molar ratio of said monobasic acid and monofunctional alcohol in the mixture ranging between 0.5:1.5 and 1.5:0.5.

* * * * *